United States Patent
Buckner et al.

(10) Patent No.: US 7,604,023 B2
(45) Date of Patent: Oct. 20, 2009

(54) UTILITY VALVE ACCESS AND PERFORMANCE EVALUATION MEANS

(76) Inventors: Lynn A. Buckner, P.O. Box 609, Chickamauga, GA (US) 30707; Don M. Buckner, Sr., 3702 Rodgers Ind. Park, Okahumpka, FL (US) 34762

( * ) Notice: Subject to any disclaimer, the term of this patent is extended or adjusted under 35 U.S.C. 154(b) by 465 days.

(21) Appl. No.: 10/683,674

(22) Filed: Oct. 14, 2003

(65) Prior Publication Data

US 2005/0076965 A1 Apr. 14, 2005

(51) Int. Cl.
*A01G 25/09* (2006.01)
(52) U.S. Cl. .................................. 137/899.4
(58) Field of Classification Search ............. 137/899.4, 137/355.12, 272; 73/168
See application file for complete search history.

(56) References Cited

U.S. PATENT DOCUMENTS

| | | | | |
|---|---|---|---|---|
| 3,267,509 A * | 8/1966 | Boyd | ............................ | 15/314 |
| 3,395,467 A * | 8/1968 | Allen et. al. | ................... | 37/195 |
| 3,678,534 A * | 7/1972 | Hilbig | ........................ | 15/345 |
| 4,085,551 A * | 4/1978 | Ward | ........................... | 451/26 |
| 4,322,868 A * | 4/1982 | Wurster | ........................ | 15/302 |
| 4,561,459 A * | 12/1985 | Jackman | ...................... | 137/291 |
| 5,713,583 A * | 2/1998 | Hansen | ..................... | 280/47.19 |
| 5,848,373 A * | 12/1998 | DeLorme et al. | ............. | 701/200 |
| 6,013,138 A * | 1/2000 | Sinz | ............................. | 134/10 |
| 6,095,429 A * | 8/2000 | Killgrove et al. | ............. | 239/172 |
| 6,619,112 B2 * | 9/2003 | Juhasz | ........................... | 73/168 |
| 6,679,222 B1 * | 1/2004 | Reischl et al. | ............... | 123/305 |
| 6,776,068 B2 * | 8/2004 | Reuschel et al. | ................ | 81/54 |
| 6,776,584 B2 * | 8/2004 | Sabini et al. | ................... | 417/22 |
| 6,850,843 B2 * | 2/2005 | Smith et al. | .................. | 701/213 |
| 2004/0252556 A1 * | 12/2004 | Taylor et al. | ........... | 365/189.05 |

* cited by examiner

*Primary Examiner*—John Rivell
*Assistant Examiner*—Craig M Schneider

(57) ABSTRACT

A vacuum container mounted on a vehicle, a trailer, or skid mounted with options chosen from an articulating boom, a liquid pressure dissipater, a utility valve actuator, having a drive motor for the valve actuator being either hydraulic, air, or electric powered, a global positioning system to determine and log the position of work, service or hardware, controls and measuring devices and de-chlorinator. Dirt or debris are made vacuum able by using a pressurized water nozzle, air pressure nozzle, or tools powered by the auxiliary power supply.

19 Claims, 6 Drawing Sheets

UTILITY VALVE ACCESS AND PERFORMANCE EVALUATION MEANS

BACKGROUND OF THE INVENTION

Utility valves have historically been buried either on purpose or by silt from storms. Access to the valve was accomplished mechanically by a shovel and hand digging. A hand wrench or hand tool is used to open or close the valve. In the case of fire hydrants the valve was opened by hand, a fire hose attached and the water flow through the hose was released under pressure on the highway or yard, eroding and doing damage.

To overcome the limitations of the prior art, the present invention uses hydro vacuum excavation to access buried valves, a hydraulic torque wrench to actuate the valve and in the case of hydrants, a liquid pressure dissipater consisting of a plurality of baffles releases the discharged water with minimum pressure like rain onto the ground thus reducing erosion. A GPS documents physical location and measuring means document maintenance condition of the valve and characteristics of the utility. Controllers manage the interaction of the various functions of the invention. The system is mounted on a transportable means.

SUMMARY OF THE INVENTION

The present invention relates to using a vacuum container having a vacuum producing means and vacuum hose to vacuum debris from buried in ground valves so that the valve stem or valve handle may be accessed in order to actuate the valve.

A water pump and water jetter may also accompany the vacuum system in order to dislodge and make vacuum able the debris around a valve or in a valve box. A power head such as a hydraulic motor, D.C. motor, air motor or air cylinder may be used to actuate a valve open or closed. A hydraulic motor power head may be mounted on a boom are. The boom arm having two or more arms may be used to locate the power head into position. Extensions may be used between the power head and the valve stem especially when a valve is located below ground level. Control means are provided to operate the forward and reverse rotation of the valve stem as well as power head positioning onto the valve stem. Metering and monitoring means are provided to document the opening, closing, and torque required to actuate the valve, as well as utility flow volumes and characteristics. When large volumes of water are released under pressure such as in the testing of fire hydrants, a pressure dissipating means may be used to avoid water damage to the surrounding area without obstructing the flow from test valves.

The above-mentioned, functions as a unit to accomplish a common objective, which is to access, actuate, and document location, flow rates, pressure, utility characteristics, and condition of utility valves.

The above-mentioned objectives are accomplished by the present invention by constructing a transportable unit consisting of a vacuum container system, a water pressure pump and water jet, a power supply, a power head to actuate the valves open or close, a boom arm to support and move the power head drive motor into a location above the utility valve, a pressure dissipating means and a hose to connect the valve to the pressure dissipating means along with a GPS locator system, performance documenting means and controls to operate the interaction of the above mentioned system. A de-chlorinator may be added so as to decontaminate water before it is released into a storm drain or onto the ground.

DESCRIPTION OF THE PREFERRED EMBODIMENT

Figure 1:
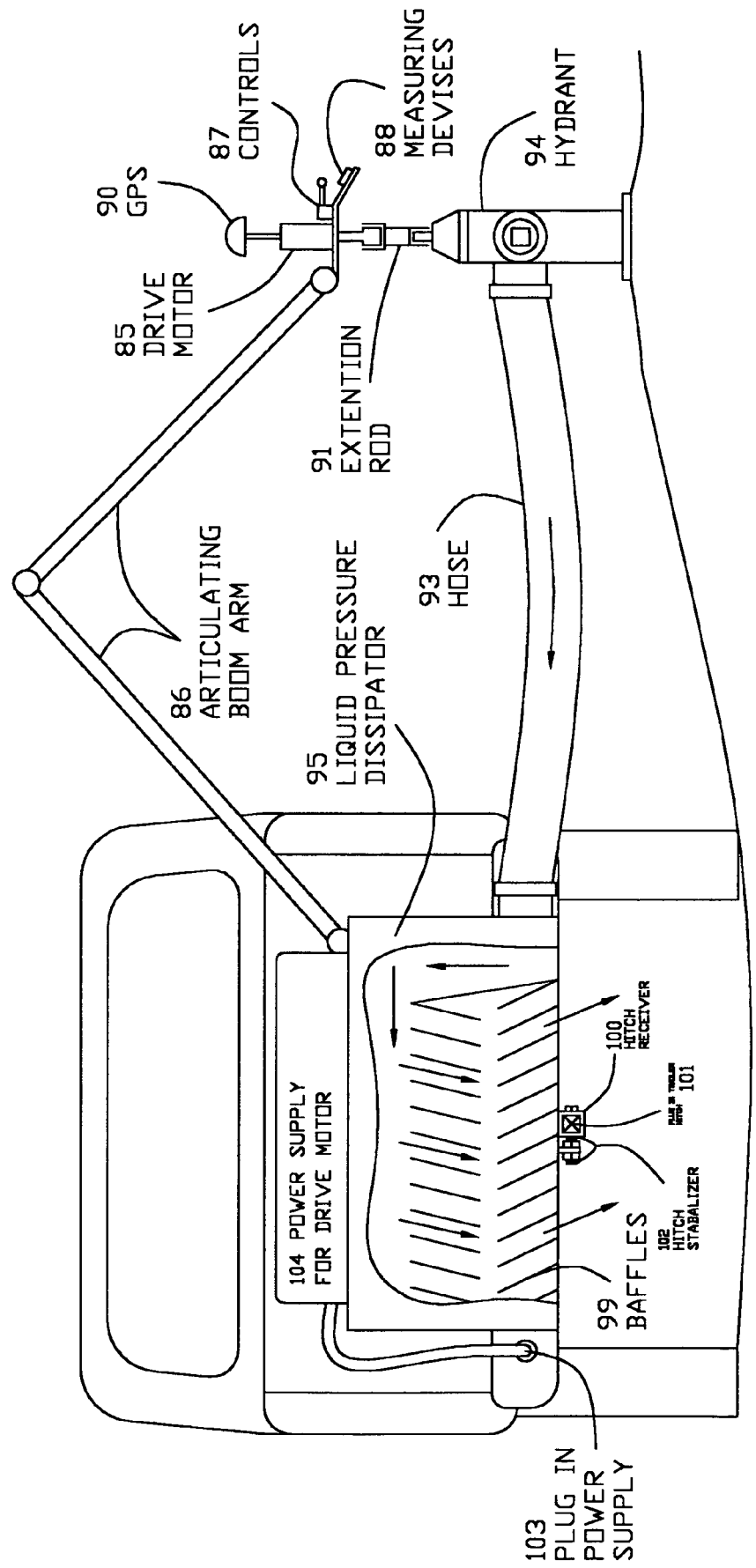
FIG. 1 is an end view of a truck with a liquid pressure dissipater 95 mounted on a hitch 101 plugged into a receiver coupler 100 at the back bumper of a vehicle. A hitch stabilizer 102 secures the unit. A fire hose 93 attaches the liquid pressure dissipater 95 to a fire hydrant 94, which has been opened by a power head 85, which is supported by an articulating boom arm 86, which is mounted to the liquid pressure dissipater 95. A hydraulic power supply 104 powers the hydraulic drive motor 85. The hydraulic power supply 104 is battery operated and the battery is charged by the truck electrical system by way of the electrical plug in 103. A GPS 90 locates the physical position of the water hydrant. The baffles 99 in the liquid pressure dissipater 95 allow the water 2 to fall to the ground like rain. Controls 87 operate the drive motor 85 and measuring devices 88 record the torque & revolutions to open or close the valve.
Figure 2:
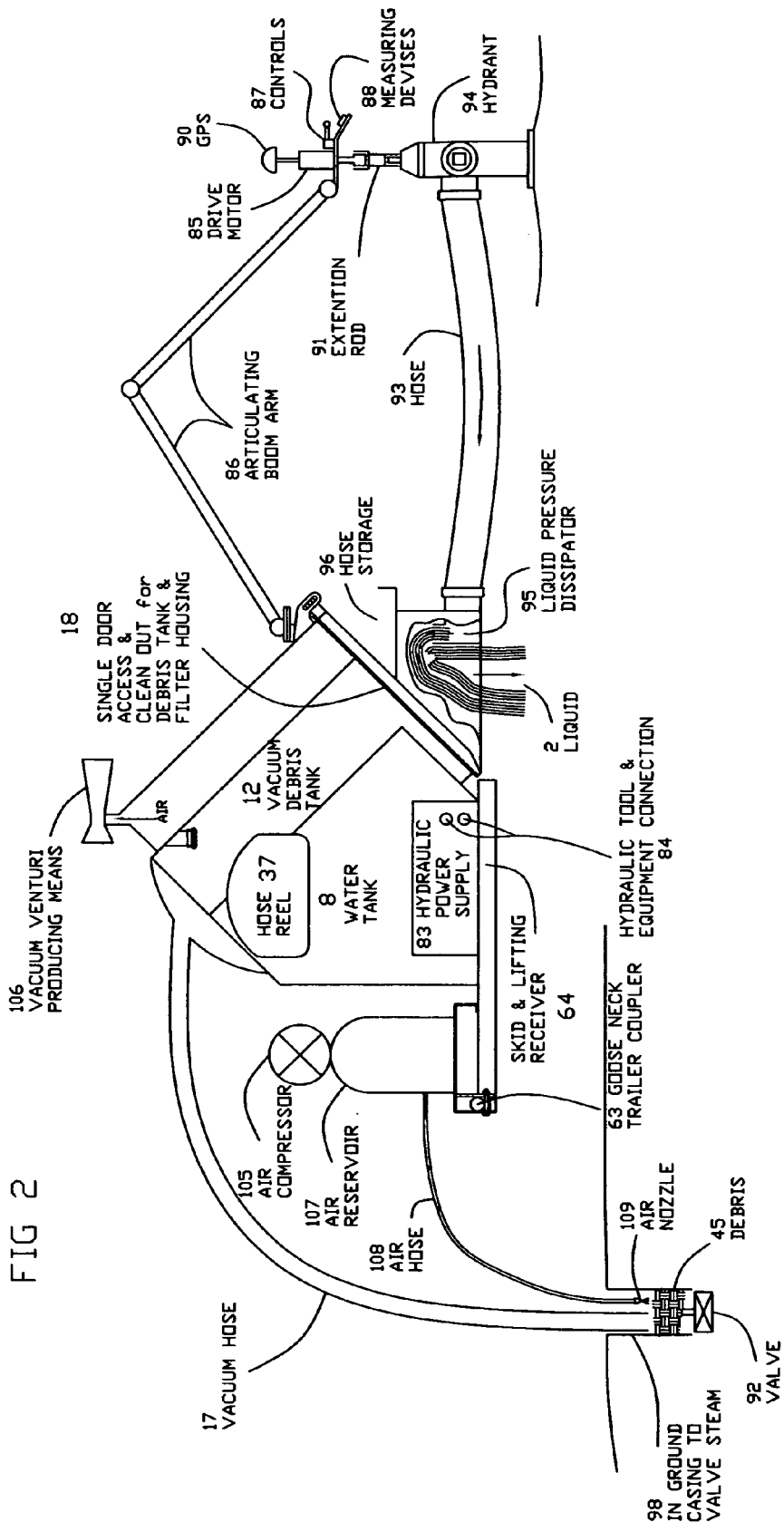
FIG. 2 is a side view of a vacuum debris tank 12 having a filter housing 62 a hose reel 37 and a single rear door 18 access to the debris tank 12. A power plant 67 consists of a diesel or gas engine to power an air compressor 105, or 12-VDC generator for charging batteries and powering the control systems. A hydraulic power supply 83 may be direct engine driven, belt driven or 12-VDC battery powered. The hydraulic power supply 83 may have connections 84 to power tools and portable equipment. The hydraulic power supply 83 may also power the valve actuator drive motor 85. The articulating boom arm 86 is shown to have two arms and may also be hydraulically manipulated. A liquid pressure dissipater 95 is shown mounted to the rear door 18 and liquid 2 is shown dropping to the ground. A hose storage area 96 is shown over the pressure dissipater 95. An articulated boom having two arms 86, which holds the valve actuator motor 85, is shown attached to the vacuum container filter housing 62. This boom arm 86 may also be used to support a vacuum hose. The boom may be powered by air pressure or hydraulic or linear actuator. An air reservoir 107, air hose 108 and air nozzle 109 are shown loosening debris 45 from a valve box 98. Vacuum hose 17 is shown vacuuming the debris 45 into a vacuum tank 12. The vacuum producing means in this case is shown to be a compressed air venturi vacuum source 106. The above system is skid mounted 64 so it can be mobilized by a skid steer, forklift, truck bed or other mobile vehicle.
Figure 3:
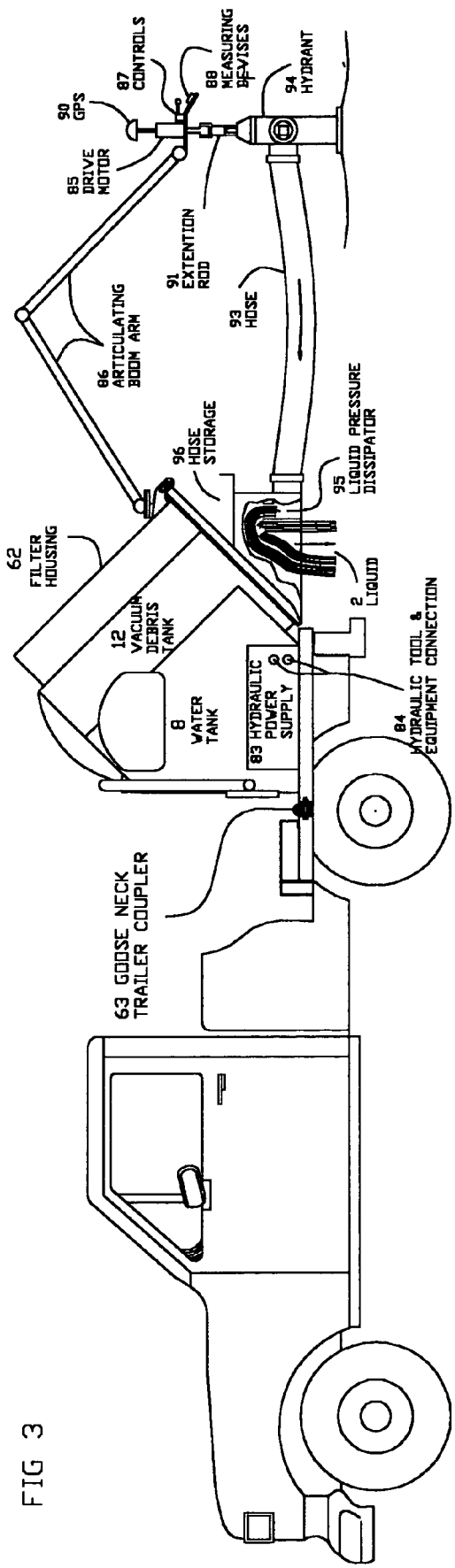
FIG. 3 is similar to FIG. 2 with the exception that the system is shown mounted on a truck bed secured by a gooseneck trailer coupler 63.
Figure 4:
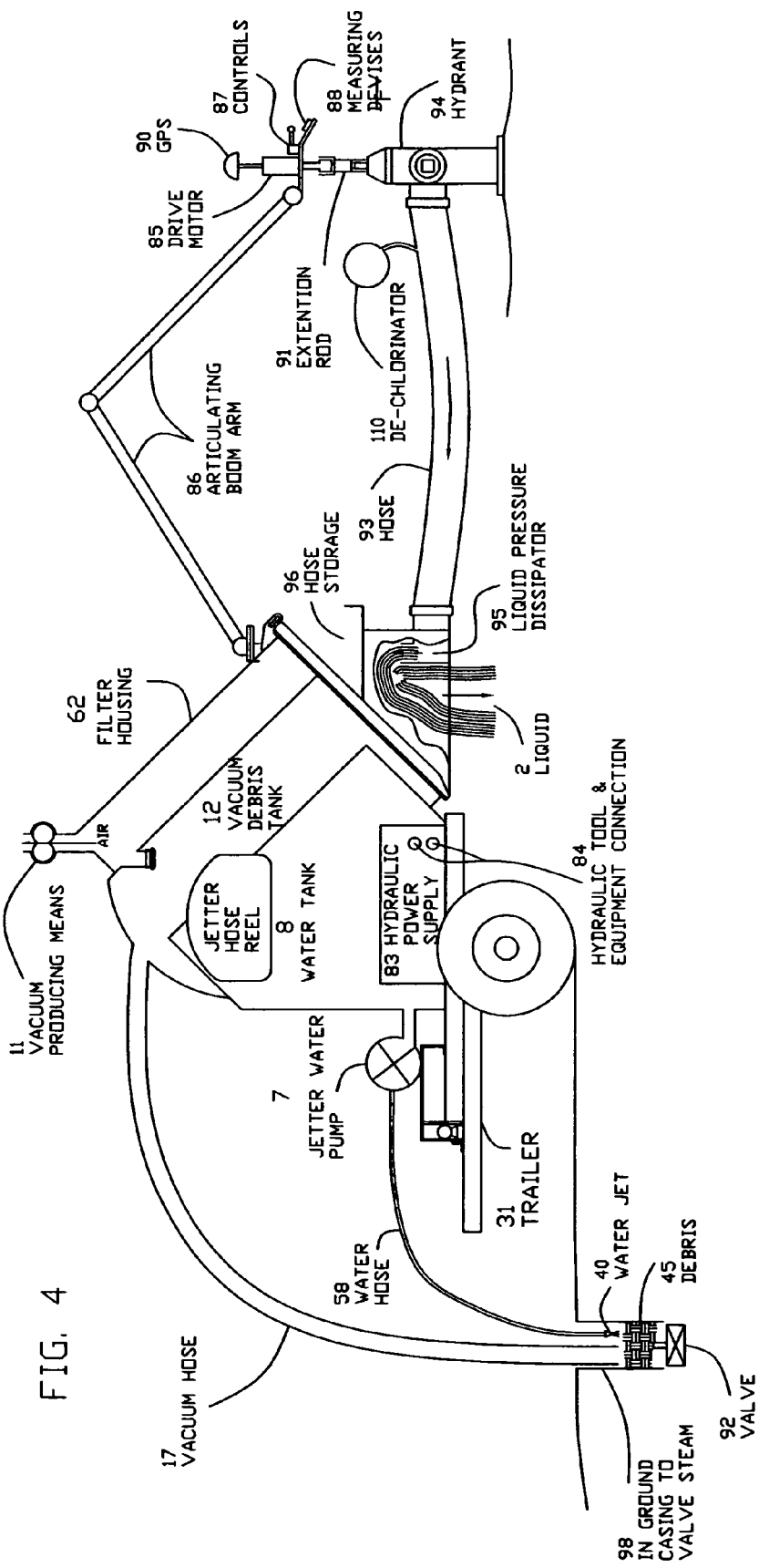
FIG. 4 is similar to FIG. 2 with the exception that the system is mounted on a trailer and vacuum hose 17 is shown vacuuming debris 45, which has been loosened by a water jetter, which consists of a water jet 40, a water hose 58, a water pump 7, a water storage tank 8, and a hose reel 37. The above vacuum and jetter system cleans debris 45 from an in-ground casing 98 or valve box, which allows access to the buried valve 92 stem. A de-chlorinator 110 is also shown.
Figure 5:
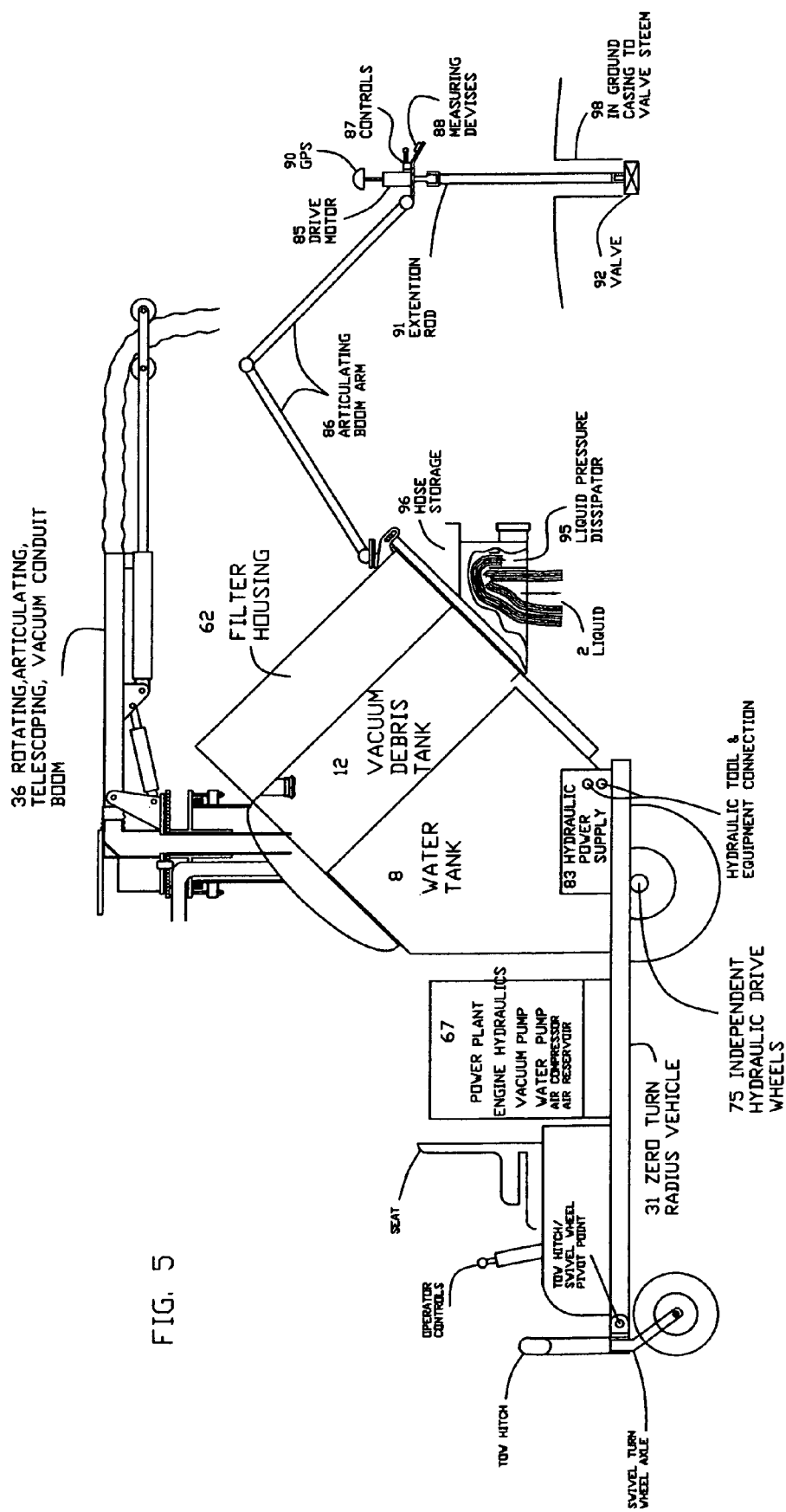
FIG. 5 is similar to FIG. 2 with the exception that the system is shown mounted on a zero turn radius vehicle 31 having a powered vacuum boom 36. The power head drive motor 85 is shown to be supported over the in ground utility valve 92 by the articulating boom 86, which may also be powered or manual with spring balancing. The power head drive motor 85 is shown actuating a buried valve 92 by means of an extension rod 91.
Figure 6:
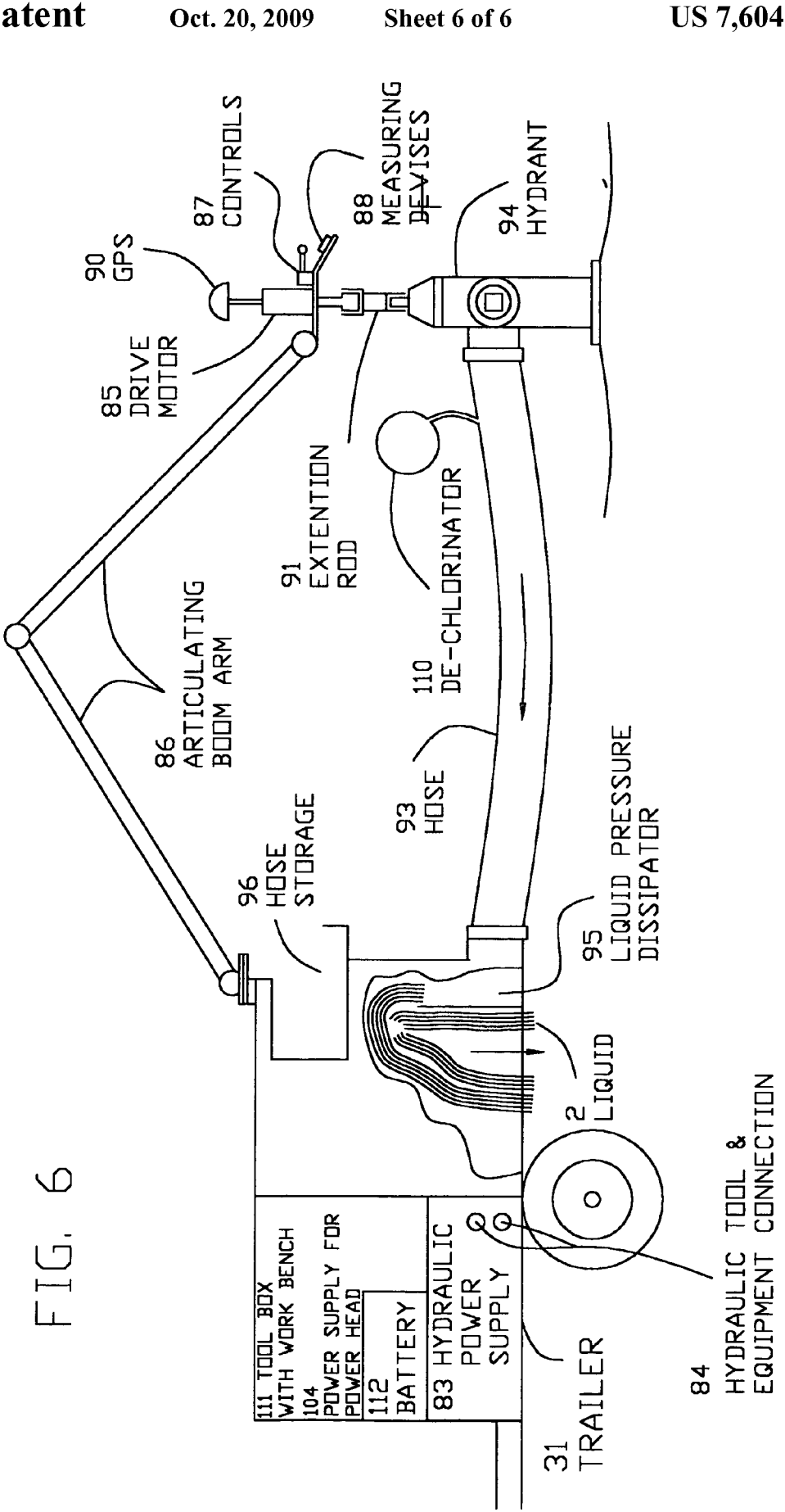
FIG. 6 is similar to FIG. 1 with the addition of a Trailer 31, a hydraulic power supply 83 for operating hydraulic tools 84; a de-chlorinator 110 is also shown. The de-chlorinator removes chlorine before hydrant water is disposed on to the ground or storm drain. A tool box 111 may also have a workbench or workstation attached.

It is the objective of this invention to provide a valve actuator power head 85, which may consist of a hydraulically driven drive motor or a DC electric motor of AC electric motor or an air driven motor or cylinder to turn a valve stem in order to open or shut the valve 92 or hydrant 94.

The valve actuator power head drive motor 85 may be positioned into place over the valve by the aid of an articulating boom arm, which may be manually moved with the aid of springs or it may be powered. Adapters and extension rods 91 assist in reaching and coupling the valve actuator power head drive motor 85 to the valve stem of the valve 92 or hydrant 94. A (GPS) Global Positioning System 90 may be used to document and transmit date to a computer-mapping program. Measuring devices 88 may document and transmit to a computer program the torque required to open and close a valve, the number of revolution to open and close the valve, the flow through the valve at full open, full closed, and values in between, as well as temperature, pressure and mechanical condition of the valve. In the case of fire hydrants 94, which are typically checked for full flow through a fire hose to atmosphere under pressure, a liquid pressure dissipater 95 (consisting of an outer shell, an open bottom, a fire hose connection and multiple baffles 99 to dissipate energy before releasing the water to the ground) is attached to the discharge of a fire hose 93, which has its supply end connected to a fire hydrant 94. This liquid pressure dissipater 95 drops the water to the ground like rain thus reducing erosion.

The above described means may be mounted on a plug in hitch 101 attachment to a vehicle hitch receiver 100 or it may be mounted on the bed of a truck, or skid mounted to be transported by a skid steer or forklift. The system may also be mounted on a trailer.

It is a further objective of the invention to access below ground utility valves, which often requires the removal of debris, gravel, or dirt before the valve stem is accessible to be opened or closed by a valve actuator power head drive motor 85. With hard to turn valves the power head 85 may consist of an impact torque or pulsed torque to loosen frozen valves. Debris, gravel, or dirt 45 may be loosened by water pressure or air pressure to make it vacuum able. A vacuum container system vacuums an access to the valve stem 92. A valve box 98 can have silt vacuumed from it with a vacuum hose 17 attached to a vacuum tank 12, having a filter housing 62 and a vacuum producing means 11. Said vacuum producing means 11 may be generated by a compressed air venturi system or a mechanical vacuum pump blower.

DEFINITION

- 2—Liquid
- 7—Liquid Transfer Pump
- 8—Container to hold liquids
- 11—Vacuum producing means
- 12—Vacuum Container
- 17—Vacuum Conduit
- 18—End Door to Vacuum Container 12
- 31—Mobile Platform
- 36—Means to Mobilize Vacuum Conduit 17
- 37—Hose Reel
- 40—Water Jet
- 45—Debris
- 58—water Hose
- 62—Filter Housing
- 63—Gooseneck Trailer Coupler
- 64—Skid and Lifting Receiver
- 67—Power Plant
- 75—Independent Hydraulic Drive Wheels
- 83—Hydraulic Power Supply
- 84—Hydraulic Tool and Equipment Connection
- 85—Hydraulic driven motor or electric driven motor
- 86—Articulating boom arm
- 87—Control system for drive motor
- 88—Revolution counter, torque and/or measuring devises
- 90—GPS (Global Positioning System) to map the location of drive motor operation such as the location of a valve to be opened or closed or a core sample to be taken or a man hole location or repair point location or bored hole location.
- 91—Adapters for the drive motor such as extensions to reach and connect to valve stems or augers
- 92—Valve with valve stem
- 93—Hose
- 94—Water Hydrant
- 95—Water pressure reducer—diffuser
- 96—Hose storage
- 98—In-ground casing to valve
- 99—Baffling to absorb energy and reduce water pressure
- 100—Hitch Receiver
- 101—Hitch Receiver plug in
- 102—Hitch Stabilizer means
- 103—Vehicle plug in power supply
- 104—Power Supply for drive motor
- 105—Air Compressor
- 106—Compressed Air Venturi Vacuum Source
- 107—Air Reservoir
- 108—Air Hose
- 109—Air Nozzle
- 110—De-chlorinator
- 111—Tool Box with workbench top or workstation
- 112—Battery

What is claimed:

1. A mobile utility valve actuator and vacuum excavation method for accessing and opening or closing an in ground utility valve, comprising the steps of: having a mobile platform means wherein said mobile platform is chosen from one or more of a group consisting of a trailer, a skid, a truck, a zero turn radius vehicle, a fork lift, and a skid steer, and further comprising the steps of having a vacuum container adjacently mounted on said mobile platform, and said vacuum container having a vacuum producing means to create a vacuum within said vacuum container, and further comprising the step of having a vacuum hose to vacuum a liquid or solids into said vacuum container, and further comprising the step of having a boom means, and said boom means having two or more arms, and said boom means having a first end pivot ably mounted on said mobile platform, and said pivot ably mounted boom means having a second end connected to said valve actuator and further comprising the step of said valve actuator having a rotate able shaft, and said rotate able shaft further comprising the step of having an attachment means of adjacently mounting said rotate able shaft to a valve stem of said in ground utility valve.

2. A mobile utility valve actuator and vacuum excavation method for accessing and opening or closing an in ground utility valve, comprising the steps of: having a mobile platform means, and said mobile platform having a vacuum container adjacently mounted to said mobile platform, and said vacuum container having a vacuum producing means to create a vacuum within said vacuum container, and said vacuum container having a vacuum conduit means to vacuum a liquid or solids into said vacuum container, and further comprising the step of having a boom means, and said boom means having two or more arms, and said boom means having a first end pivot ably mounted adjacent to said mobile platform, and said pivot ably mounted boom means having a second end pivot ably connected to said valve actuator means, and further comprising the step of said valve actuator having a rotate able shaft and further comprising the step of said rotate able shaft having an adapter means for connecting said rotate able shaft to the valve stem of said in ground utility valve, and further comprising the step of having a pressure measuring means adjacently mounted in communication with said valve actuator means whereby said pressure measuring means can be used in monitoring the torque required to rotate said rotate able shaft.

3. A mobile utility valve actuator and vacuum excavation method for accessing and opening or closing an in ground utility valve, comprising the steps of: having a mobile platform means, wherein said mobile platform is chosen from one or more of a group consisting of a trailer, a skid, a truck, a zero turn radius vehicle, a fork lift, and a skid steer, and further comprising the step of mounting a power plant adjacent to said mobile platform and said power plant consisting of one or more components chosen from a group consisting of a gas engine, a diesel engine, a vacuum pump, a water pump, an air compressor, a generator, a battery, a hydraulic pump, and a hydraulic power circuit to power hydraulically powered tools, and further comprising the step of having a vacuum container adjacently mounted to said mobile platform, and said vacuum container having a vacuum producing means to create a vacuum within said vacuum container, and further comprising the step of said vacuum container having a vacuum hose means to vacuum liquid or solids into said vacuum container, and further comprising the step of having a boom means, and said boom means having two or more arms, and said boom means having a first end pivot ably mounted adjacent to said mobile platform, and said pivot ably mounted boom means having a second end adjacently mounted to said valve actuator, wherein said valve actuator is chosen from one or more of a group consisting of a hydraulic drive motor, an electric drive motor, an air driven motor, and an air cylinder, and further comprising the step of said valve actuator having a rotate able shaft and further comprising the step of said rotate able shaft having an adapter means for adjacently connecting said rotate able shaft to a valve stem of said in ground utility valve, and further comprising the step of rotating said valve stem of said in ground utility valve in order to open or close said in ground utility valve, and further comprising the step of mounting a pressure measuring means adjacent to said valve actuator, whereby said pressure measuring means can be used in monitoring the torque required to rotate said rotate able shaft, and further comprising the step of mounting a rotation counting means adjacent to said valve actuator whereby said rotation counting means can count the rotations of said rotate able shaft, and further comprising the step of having a transmitter adjacently mounted in communication with said pressure measuring means and rotation counting means and further comprising the step of said transmitter, transmitting data from said pressure measuring device and rotation counting device to a computer.

4. A mobile utility valve actuator and vacuum excavation method for accessing and opening or closing an in ground utility valve, according to claim 1 wherein said mobile utility valve actuator comprises an additional step of said rotate able shaft having an extension means for connecting said rotate able shaft of said valve actuator to the valve stem of said in ground utility valve.

5. A mobile utility valve actuator and vacuum excavation method for accessing and opening or closing an in ground utility valve, according to claim 1 wherein said mobile utility valve actuator and vacuum excavation method comprises an additional step of: mounting a measuring means adjacent to said valve actuator whereby said measuring means can measure the torque required to rotate said rotate able shaft.

6. A mobile utility valve actuator and vacuum excavation method for accessing and opening or closing an in ground utility valve, according to claim 1 wherein said mobile platform comprises an additional step of: mounting a liquid pressure dissipater means adjacent to said mobile platform and wherein said liquid pressure dissipater further comprises the steps of having an inlet to accept water under pressure from a water fire hydrant, a water flow deflector to absorb energy in the form of pressure, and an outlet to allow water to exit said water pressure dissipater.

7. A mobile utility valve actuator and vacuum excavation method for accessing and opening or closing an in ground utility valve, according to claim 1 wherein said mobile platform comprises an additional step of: mounting a liquid pressure dissipater means adjacent to said vacuum excavation means and wherein said liquid pressure dissipater further comprises the steps of having an inlet to accept water under pressure from a water fire hydrant, a water deflector to absorb energy in the form of pressure, and an outlet to allow water to exit said liquid pressure dissipater, and further comprises the step of, mounting a de-chlorinator means adjacent to said liquid pressure dissipater means.

8. A mobile utility valve actuator and vacuum excavation method for accessing and opening or closing an in ground utility valve, according to claim 1 wherein said mobile platform comprises an additional step of: mounting a liquid pressure dissipater means adjacent to said mobile platform and wherein said liquid pressure dissipater means further comprises the steps of having an inlet to accept water under pressure from a water fire hydrant, whereby a water hose can have a first end attached to said inlet of said liquid pressure dissipater means and a second end of said water hose can be attached to water fire hydrant outlet, and said liquid pressure dissipater means further comprises the steps of having a water flow deflector to absorb energy in the form of pressure, and said liquid pressure dissipater means further comprises the steps of having an outlet to allow water to exit said water pressure dissipater means and further comprising the step of adjacently mounted to said mobile platform means, one or more of a group chosen from the group consisting of, a water flow measuring means, a temperature measuring means, a pressure measuring means, a rotation counting means, a torque measuring means, a controller means, a monitor, a Global Positioning System signal receiver means, a transmitter, a computer, a mapping program, and a data logging documenting means, whereby information associated with the performance or mechanical condition of a utility valve can be collected, and transmitted to a data documentation means such as a computer with a utility mapping program.

9. A mobile utility valve actuator and vacuum excavation method for accessing and opening or closing an in ground utility valve, according to claim 1 or 2 wherein said mobile utility valve actuator and vacuum excavation method comprises an additional step of mounting a rotation counter means adjacent to said utility valve actuator whereby said rotation counter means can count the revolutions of said rotate able shaft.

10. A mobile utility valve actuator and vacuum excavation method for accessing and opening or closing an in ground utility valve, according to claim 1 or 2 wherein said mobile utility valve actuator and vacuum excavation method comprises an additional step of: mounting a controller adjacent to said valve actuator and said controller further comprising the step of reversing the direction of rotation of said rotate able shaft.

11. A mobile utility valve actuator and vacuum excavation method for accessing and opening or closing an in ground utility valve, according to claim 1 or 2 wherein said mobile utility valve actuator and vacuum excavation method comprises an additional step of: mounting a Global Positioning System signal receiver adjacent to said valve actuator.

12. A mobile utility valve actuator and vacuum excavation method for accessing and opening or closing an in ground utility valve, according to claim 1 or 2 wherein said mobile utility valve actuator and vacuum excavation method comprises an additional step of: mounting one or more measuring means adjacent to said valve actuator and further comprising the step of adjacently mounting a transmitter in communication with said measuring means and further comprising the step of transmitting information, collected by said measuring means, to a computer.

13. A mobile utility valve actuator and vacuum excavation method for accessing and opening or closing an in ground utility valve, according to claim 1 or 2 wherein said mobile utility valve actuator and vacuum excavation method comprises an additional step of: said vacuum conduit means vacuuming vacuum able liquid or solids from an in ground casing access means to said in ground utility valve.

14. A mobile utility valve actuator and vacuum excavation method for accessing and opening or closing an in ground utility valve, according to claim 1 or 2 wherein said mobile utility valve actuator and vacuum excavation method comprises an additional step of: mounting a water tank, water pump, and water hose adjacent to said mobile platform, and further comprising the step of jetting water onto earthen material, whereby said jetted water can make vacuum able said earthen material found adjacent to said valve stem of said in ground utility valve.

15. A mobile utility valve actuator and vacuum excavation method for accessing and opening or closing an in ground utility valve, according to claim 1 or 2 wherein said mobile utility valve actuator and vacuum excavation method comprises an additional step of: mounting an air tank, air compressor means, air hose and air nozzle adjacent to said mobile platform, and further comprising the step of directing air under pressure onto an earthen material, whereby said pressurized air can make vacuum able earthen material found adjacent to said valve stem of said in ground utility valve.

16. A mobile utility valve actuator and vacuum excavation method for accessing and opening or closing an in ground utility valve, according to claim 1 or 2 wherein said valve actuator is chosen from one or more of a group consisting of a hydraulic drive motor, an electric drive motor, an air driven motor, and an air cylinder.

17. A mobile utility valve actuator and vacuum excavation method for accessing and opening or closing an in ground utility valve, according to claim 1 or 2 wherein said mobile platform comprises an additional step of: mounting a power plant adjacently to said mobile platform and said power plant consisting of one or more components chosen from a group consisting of a gas engine, a diesel engine, a vacuum pump, a water pump, an air compressor, a generator, a battery, a hydraulic pump, a goose neck coupler, and a hydraulic power circuit to power hydraulically powered tools.

18. A mobile utility valve actuator and vacuum excavation method for accessing and opening or closing an in ground utility valve, according to claim 2 wherein said mobile platform means is chosen from one or more of a group consisting of a trailer, a skid, a truck, a zero turn radius vehicle, a fork lift, and a skid steer.

19. A mobile utility valve actuator and vacuum excavation method for accessing and opening or closing an in ground utility valve, according to claim 1, 2 or 3 wherein said mobile platform means further comprising the step of adjacently mounting to said mobile platform one or more of a group chosen from the group consisting of a water flow measuring means, a temperature measuring means, a pressure measuring means, a rotation counting means, a torque measuring means, a controller means, a monitor means, a metering means, a Global Positioning System signal receiver means, a transmitter means, a computer means, a fire hydrant tester means, a utility valve performance documenting means, a utility valve mechanical maintenance documenting means, a valve a mapping program, and a data logging documenting means, whereby information associated with data collection, geographic location, elevation, date, time, and performance or mechanical condition of a utility valve can be collected, monitored, and transmitted to a data documentation means such as a computer with a utility mapping program.

* * * * *